Patented Feb. 17, 1942

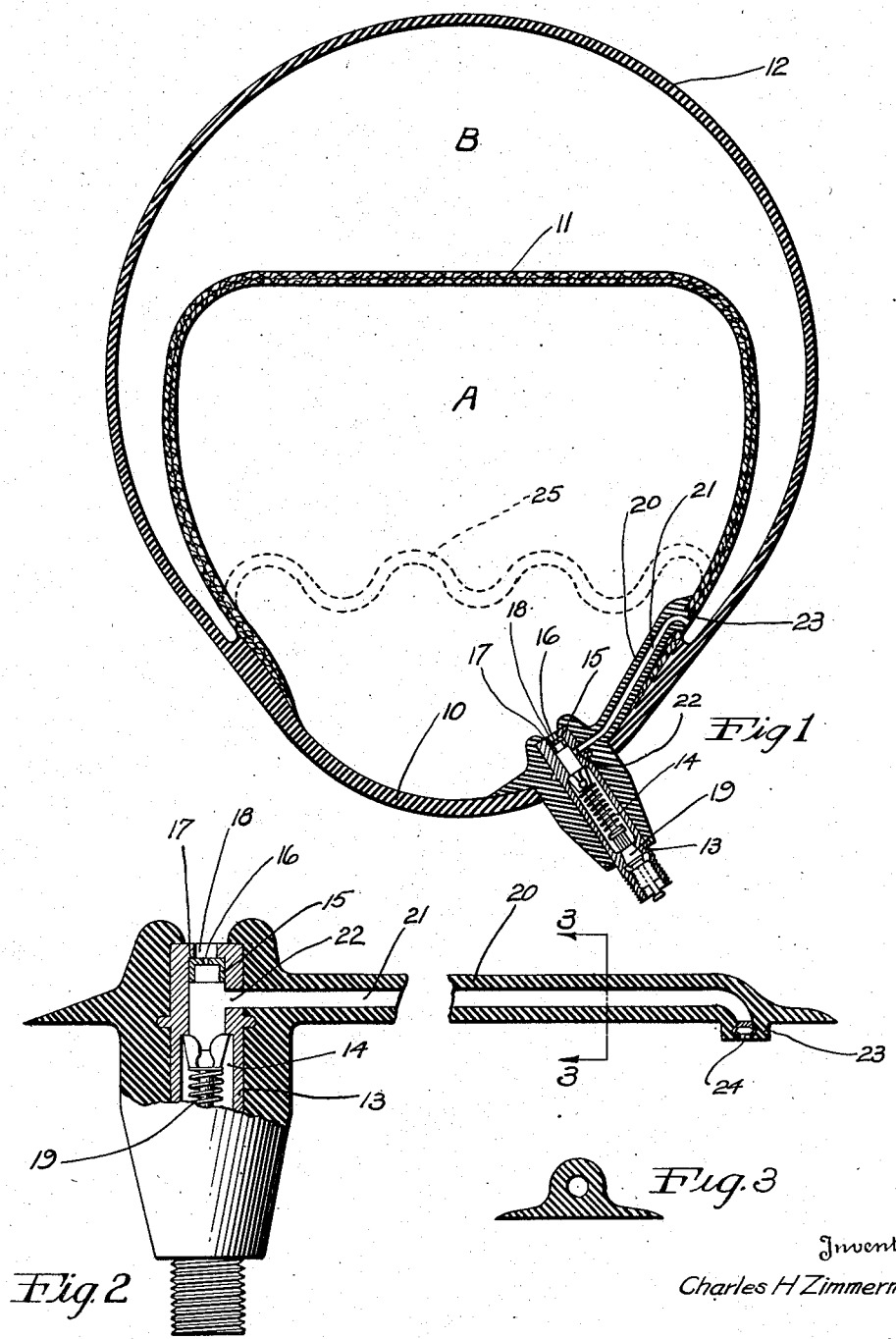

2,273,457

UNITED STATES PATENT OFFICE 2,273,457

SAFETY TUBE

Charles H. Zimmerman, Akron, Ohio, assignor to Wingfoot Corporation, Wilmington, Del., a corporation of Delaware Application April 27, 1940, Serial No. 332,018

8 Claims. (Cl. 152—342)

The present invention relates to safety tubes of the type in which there is a plurality of chambers. Particularly this invention is shown in connection with a two-chambered tube of the type disclosed in the Lee Patent No. 2,173,065 in which one chamber is enclosed within a second chamber, the walls of the chambers being joined at their bases. The tube is provided with a single valve for inflating both chambers.

An object of the present invention is to provide a valve for quickly inflating a tube of the character shown particularly in the Lee patent, whereby the same requires only substantially about the same time to inflate as the ordinary inner tube.

Another object of this invention is to inflate the outer chamber of the tube rapidly while permitting slow filtration of air to the inner tube after inflation and/or partially during inflation.

More particularly, my invention contemplates employing in a tube of the character described a valve having separate ports for supplying air to both chambers simultaneously, but at different rates, the inner chamber being supplied with air at the slower rate whereby the walls thereof will not be distended to place a strain on same that might injure the walls or cause detachment of same from the walls of the outer chamber.

Other objects of the invention will appear hereinafter as the description thereof proceeds, the novel features, arrangements and combinations being clearly set forth in the specification and in the claims thereunto appended.

In the drawing:

Fig. 1 is a transverse cross-section through a tube embodying my invention;

Fig. 2 is an enlarged cross-section through the valve embodying my invention; and Fig. 3 is a cross-section taken along the line 3—3 of Fig. 2.

The use of a restricted opening in the wall of the inner chamber, as in the aforesaid Lee patent, provides for positive controlled deflation in case of blow-out or failure of either chamber and does not rely on the closing of a valve, as in some safety tubes, to give quick inflation and/or deflation with a consequent trapping of air in the good chamber. Such valves may fail to work, especially when traveling at high speeds, since centrifugal force may keep same from working. Also such valves may be destroyed or impaired, such as when the tire goes flat or an obstruction is hit.

It is desirable, however, to insure quick inflation but it is not desirable to eliminate the valuable feature of a metered outlet for the air from either chamber upon failure of the other. My present invention embodies a device that will will meet these requirements and possess all the advantages of the aforesaid Lee tube, while providing for quick inflation.

In the drawing I have shown in cross-section a tube comprising an inner chamber A and an outer chamber B formed by two continuous annular tubes joined by a common wall 10 at the base. The wall 11 of chamber A is formed of rubberized fabric while the wall 12 of chamber B is preferably formed of stretchable rubber so that it may expand and fill a tire carcass.

The valve of this invention is formed with a metal stem 13 having a longitudinal bore 14 which is restricted at its end by a reducing plug 15 having a small port 16 therein which permits air to enter chamber A only at a relatively slow rate. This port 16 is preferably not over .05 inch in diameter and usually smaller. The purpose of this will appear later. The plug 15 seats against a shoulder 17 on the valve stem and is press-fitted into the stem of the valve after cure of the inner chamber A or of the completed tube, whereby air can enter and leave the inner chamber A rapidly during cure through the larger opening 18, thus reducing the curing time.

The stem is embedded in rubber and has a rubber base, as in valves of this character, and is provided with the usual check valve or valve insert 19 to prevent the back flow of air out of the valve stem during or after inflation.

The base is formed with a lateral extension 20 formed with a passage 21 communicating with a port 22 in the valve stem. This extension has a cross-section, such as shown in Fig. 3. The outer end of extension 20 is provided with a boss 23 which is inserted in a corresponding opening in the wall 11 so that the passage 21 will communicate with chamber B. The valve and extension are secured to the inner side of wall 11 before the base of the tube is closed and is vulcanized into an integral unit with the wall during the process of vulcanizing the inner chamber or carcass, as in the Lee Patent No. 2,090,210, showing the process of making such a tube.

During cure, in order to prevent rubber from flowing into the passage 21, I provide a metal insert or cap 24 which is inserted in the open end of the passage and after cure this is removed and the outer chamber formed by adding the wall 12 thereto.

During inflation the air enters through the valve stem and is distributed to chambers A and B through the ports 16 and 22. Since the port 16 is very small as compared to 22, which latter has an effective cross-section equal to that provided in the usual single-tube valve construction, only a small percentage of air enters the chamber A and most of it goes to chamber B. This causes a collapse of the wall 11 as indicated somewhat diagrammatically at 25 in Fig. 1. While the chambers do not have the desired quantity of air in same the pressure is equalized in both chambers and the total quantity of air required for both chambers is in the tube.

Since the fabric carcass A is shaped initially as shown in the drawing, there is a natural tendency to regain its former shape after deflection. Thus air seeps back through passages 21 and ports 22 and 16 into the chamber A from chamber B and eventually the required air is in chamber A. If not equalized prior to operating a vehicle, it requires only a few minutes for the equalization to take place after the wheel on which the tube is mounted is rotated, as during use of the vehicle to which same is applied. Centrifugal force aids the wall 11 to regain its normal shape.

Of course one seldom has to inflate from a zero pressure to the desired amount and the usual inflation to get three to five additional pounds of air in the tube will not collapse the wall 12 materially.

In using this invention, when one inflates the tube the pressure registered on the pressure gauge will be the same as that which exists after equalization of the amounts of air in chambers A and B, since there is only an exchange of quantities of air with no resultant drop in pressure.

When a blowout occurs or a failure of wall of either chamber results, the air leaks out of the good chamber at a slow rate through the grommet port 16. Thus, as in the aforesaid Lee Patent No. 2,173,065, while the tire eventually goes flat, the driver is given enough time to bring the vehicle to a safe stop without damaging the tire and/or tube.

If desired the ports 16 and 22 could be interchanged as to size, whereby the inner chamber A is inflated first with slow inflation of the outer chamber B but this has the objection of requiring some considerable time for proper inflation and repeated checks to determine when the desired pressure is reached. It however will provide for slow and positive metering of the air leaving the undamaged chamber when a blowout occurs.

If both ports 16 and 18 are made small, the same as 16, slow inflation occurs but a uniform distribution of the air is given to both chambers. Strain on the wall of the inner chamber A is prevented, however, since there is no building up of a pressure greater than that in chamber B unless chamber B is considerably greater in volume than chamber A.

Obviously various changes can be made in the combinations, arrangements and construction of the various parts without departing from the spirit of this invention and I do not wish to be limited except as may appear hereinafter in the claims hereunto appended.

What I claim is:

1. A plural-chambered container of the class described comprising at least two chambers, with a flexible wall separating said chambers to allow for expansion or contraction of said chambers when differential pressures are exerted in said chambers on opposite sides thereof, a valve on said container having a bore through which fluid is supplied to said chambers, said valve having two ports both communicating with said bore and each communicating with different ones of said chambers to supply fluid thereto from said bore, one of said ports having a substantial effective cross-section such as to provide for rapid flow of fluid to its respective chamber, the other port being of an effective cross-section materially less than said first port whereby fluid is supplied to said first chamber at a higher rate than said second chamber thereby causing a flexing of said wall out of its normal operative position during inflation to a stressed position other than normal due to the excess pressure built up in said first chamber because of the more rapid supply of fluid thereto, thereby reducing the volumetric capacity of the second chamber, said wall being urged toward its normal position after inflation by the action of the stress in the wall set up during inflation thus forcing some of the fluid through the communicating ports from said first chamber to said second chamber to equalize the pressures in said chambers, said ports being in constant intercommunication to equalize the pressures in said chambers at all times, and said second port being of a small enough size to permit only the slow passage of fluid therethrough, thereby providing an interconnecting passage between said chambers of the effective size of the smaller port, whereby upon failure of one chamber the fluid will leak out of the other chamber to the atmosphere through said second port at only a relatively slow rate of speed.

2. A device as set forth in claim 1 in which the two chambers are arranged radially outward, the one from the other, with the valve port of larger size supplying the outer chamber.

3. A device as set forth in claim 1 in which the two chambers are arranged radially outward, the one from the other, with the valve port of larger size supplying the outer chamber, and in which the flexible wall is inextensible, at least at the outer periphery thereof, to prevent expansion thereof beyond predetermined limits, less than the size of the tire in which the container is adapted to be mounted.

4. A device as set forth in claim 1 in which the two chambers are arranged radially outward, the one from the other, with the valve port of larger size supplying the outer chamber, and in which the flexible wall is formed of fabric molded to a predetermined shape whereby it tends to occupy a normal position providing substantially the desired volumetric capacities for the two chambers, the flexibility of the wall permitting movement thereof inwardly of its normal position but being molded so as to be inextensible and, therefore, prevented from movement outwardly beyond its normal position to a material extent.

5. A device as set forth in claim 1 in which the smaller port has an effective cross-section not substantially larger than that of a .05 inch bore.

6. A plural-chambered container of the class described comprising two chambers located radially outward one from the other, with a flexible wall separating said chambers to allow for expansion or contraction of said chambers when differential pressures are exerted in said chambers on opposite sides thereof, a valve on said container having a bore through which fluid is supplied to said chambers, said valve having two ports, one of said ports communicating with said bore and outer chamber and having a substantial effective cross-section such as to provide for rapid flow of fluid to its respective chamber, the other port communicating with said bore and said inner chamber and being of an effective cross-section materially less than said first port whereby fluid is supplied to said outer chamber at a higher rate than said inner chamber thereby causing a flexing of said wall inwardly out of its normal operative position during inflation due to the excessive pressure built up in said outer chamber, because of the more rapid supply of fluid thereto, thereby reducing the volumetric capacity of the inner chamber, said wall being moved outwardly under the action of centrifugal force under service conditions thus forcing some of the fluid through the communicating ports from said outer chamber to said inner chamber to equalize the pressures in said chambers, said ports being in constant intercommunication to equalize the pressures in said chambers, and said second port being of a small enough size to permit only the slow passage of fluid therethrough, thereby providing an interconnecting passage between said chambers of the effective size of the smaller port, whereby upon failure of one chamber the fluid will leak out of the other chamber to the atmosphere through said second port at only a relatively slow rate of speed.

7. A valve for use in inflating plural-chambered tubes comprising a valve body having a bore, at least two unobstructed and continuously open ports communicating with said bore for supplying fluid introduced into said bore to different ones of the chambers of a plural-chambered tube, one of said ports being of substantially small cross-section with an effective size of not substantially more than that of a circular opening .05 inch in diameter, the other of said ports being of a substantially greater effective cross-section, said ports being unobstructed at all times and in constant intercommunication, the bore being provided with a check valve to prevent return flow of fluid supplied to said bore.

8. A valve for use in inflating plural-chambered tubes comprising a valve body having a bore extending therethrough, a port of substantial cross-section communicating with said bore for use in supplying fluid to one chamber of such tube, a second port of substantial cross-section also communicating with said bore and in constant communication with said first port for supplying fluid to another chamber of such a tube, said latter port being in alignment with said bore and large enough in cross-section to permit rapid inflation and deflation of the chamber to which it supplies fluid during curing of that chamber, and a reducing plug having a restricted opening therethrough substantially smaller in effective cross-section than either of said ports and mounted in said bore to restrict said second port only, subsequent to the curing of said second chamber, said restricted opening forming a continuously open but restricted passage between the chambers of said tube when said valve is in use and being small enough in cross-section to provide for only slow passage of fluid therethrough whereby, when one of said chambers fails the other of said chambers will be only slowly deflated.

CHARLES H. ZIMMERMAN.